(12) United States Patent
Regev et al.

(10) Patent No.: US 9,942,027 B2
(45) Date of Patent: Apr. 10, 2018

(54) SYNCHRONIZATION AND RANGING IN A SWITCHING SYSTEM

(71) Applicant: ROCKLEY PHOTONICS LIMITED, London (GB)

(72) Inventors: Guy Regev, Pasadena, CA (US); Daniel Brunina, Pasadena, CA (US); Nathan Farrington, Arcadia, CA (US); Thomas Pierre Schrans, Temple City, CA (US); Chiang Yeh, Sierra Madre, CA (US)

(73) Assignee: Rockley Photonics Limited, London (GB)

( * ) Notice: Subject to any disclaimer, the term of this patent is extended or adjusted under 35 U.S.C. 154(b) by 0 days.

(21) Appl. No.: 15/466,737

(22) Filed: Mar. 22, 2017

(65) Prior Publication Data
US 2017/0279591 A1    Sep. 28, 2017

Related U.S. Application Data

(60) Provisional application No. 62/312,428, filed on Mar. 23, 2016.

(51) Int. Cl.
*H04L 7/00*    (2006.01)
*H04L 1/00*    (2006.01)
(Continued)

(52) U.S. Cl.
CPC .......... *H04L 7/0037* (2013.01); *H04J 3/0682* (2013.01); *H04L 1/0057* (2013.01);
(Continued)

(58) Field of Classification Search
CPC ............. H04L 1/0057; H04L 25/03273; H04L 5/0048; H04L 7/0037; H04L 43/0852
(Continued)

(56) References Cited

U.S. PATENT DOCUMENTS 7,215,666 B1 * 5/2007 Beshai ............... H04Q 11/0066
                                                      370/380
8,625,641 B2    1/2014 Liang
(Continued)

FOREIGN PATENT DOCUMENTS

WO    WO 97/04564 A1    2/1997

OTHER PUBLICATIONS

Lipinski, M., White Rabbit Ethernet-Based solution for sub-ns synchronization and deterministic, reliable data delivery, IEEE Plenary Meeting Geneve, Jul. 15, 2013, 124 pages, retrieved from http://www.ieee802.org/802_tutorials/2013-07/WR_Tutorial_IEEE.pdf, Jun. 29, 2017.
(Continued)

*Primary Examiner* — Emmanuel Bayard
(74) *Attorney, Agent, or Firm* — Lewis Roca Rothgerber Christie LLP

(57) ABSTRACT

A system and method for measuring propagation delays and other delays in an optical switching system. A transmitter is connected, through a circuit switch, to a receiver. To measure the propagation delay between the transmitter and the receiver, the transmitter sends one or more time-tagged ranging messages and the receiver calculates a propagation delay from the difference between the time of receipt and the time of transmission. In another embodiment, a time delay between message transmission and transition of a CDR of the receiver to a fast acquisition mode is adjusted, by trial and error, to find a range of such time delays for which transmission is successful. A time delay between the transmitter and the switch is measured by establishing or breaking the connection and determining, for various tentative time delay values, whether transmission succeeds.

25 Claims, 5 Drawing Sheets

(51) Int. Cl.
  *H04L 5/00* (2006.01)
  *H04L 25/03* (2006.01)
  *H04L 12/26* (2006.01)
  *H04J 3/06* (2006.01)
  *H04Q 11/00* (2006.01)
  *H04L 12/70* (2013.01)
(52) U.S. Cl.
  CPC ...... *H04L 5/0048* (2013.01); *H04L 25/03273* (2013.01); *H04L 43/0852* (2013.01); *H04Q 11/0005* (2013.01); *H04L 2012/5679* (2013.01)
(58) Field of Classification Search
  USPC .................................. 375/219–222, 354–360
  See application file for complete search history.

(56) References Cited

U.S. PATENT DOCUMENTS

| | | | |
|---|---|---|---|
| 9,246,852 B2 | 1/2016 | Chandhoke et al. | |
| 2008/0019282 A1 | 1/2008 | Alaria et al. | |
| 2017/0207907 A1* | 7/2017 | Anvekar | ............... H04L 7/0331 |

OTHER PUBLICATIONS

International Search Report and Written Opinion of the International Searching Authority, dated Sep. 11, 2017, Corresponding to PCT/IB2017/000382, 13 pages.

"Broadband optical access systems based on Passive Optical Networks (PON)", International Telecommunication Union, Series G: Transmission Systems and Media, Digital Systems and Networks, Digital sections and digital line system—Optical line systems for local and access networks, ITU-T Recommendation G.983.1, Jan. 2005, 124 pages.

Ni, Wenda et al., "POXN: A New Passive Optical Cross-Connection Network for Low-Cost Power-Efficient Datacenters", IEEE, Journal of Lightwave Technology, Apr. 15, 2014, pp. 1482-1500, vol. 32, No. 8.

* cited by examiner

SYNCHRONIZATION AND RANGING IN A SWITCHING SYSTEM

CROSS-REFERENCE TO RELATED APPLICATION(S)

The present application claims priority to and the benefit of U.S. Provisional Application No. 62/312,428, filed Mar. 23, 2016, entitled "PROJECT BLACK SQUIRREL: A PROPOSAL FOR TIME SYNCHRONIZATION AND RANGING", the entire content of which is incorporated herein by reference.

FIELD

One or more aspects of embodiments according to the present invention relate to switching systems, and more particularly to a system and method for measuring delays in switching systems.

BACKGROUND

In a switching system in which a transmitter is temporarily connected to a receiver through a switch, and the transmitter sends a frame of data to the receiver through the switch, the data may not be properly transmitted if the interval during which the connection exists does not include the time interval during which the frame arrives and traverses the switch. The time at which the frame arrives at the switch may be affected by the propagation delay from the transmitter to the switch, which may not be well known, a priori. Moreover, in some systems where throughput efficiency is important, a fast acquisition receiver is used, and hence data may be lost if the receiver is not in a suitable receiving mode when the frame arrives at the receiver. This time interval may be affected by the propagation delay from the switch to the receiver which also may not be well known, a priori.

Thus, there is a need for measuring delays in a switching system.

SUMMARY

Aspects of embodiments of the present disclosure are directed toward a system and method for measuring propagation delays and other delays in an optical switching system. A transmitter is connected, through a circuit switch, to a receiver. To measure the propagation delay between the transmitter and the receiver, the transmitter sends one or more time-tagged ranging messages and the receiver calculates a propagation delay from the difference between the time of receipt and the time of transmission. In another embodiment, a time delay between message transmission and transition of a CDR of the receiver to a fast acquisition mode is adjusted, by trial and error, to find a range of such time delays for which transmission is successful. A time delay between the transmitter and the switch is measured by establishing or breaking the connection and determining, for various tentative time delay values, whether transmission succeeds.

According to an embodiment of the present invention there is provided a method for measuring delays in a system including a first transmitter connected to a first receiver through a circuit switch and an arbiter connected to the first transmitter, the circuit switch, and the first receiver, the method including: while a connection between the first transmitter and the first receiver is established, performing, for each of a plurality of tentative burst mode transmitter to receiver delay values, one or more test transmissions, to generate a plurality of respective measures of success, each corresponding to one of the plurality of tentative burst mode transmitter to receiver delay values; and calculating, from the respective measures of success, an operating burst mode transmitter to receiver delay; wherein the performing of each test transmission includes, for a tentative burst mode delay value of the plurality of tentative burst mode transmitter to receiver delay values: transmitting, by the first transmitter, a phase 1 ranging message, at a first transmission start time; commanding by the first receiver, a clock and data recovery circuit of the first receiver to transition from a wait mode to a fast acquisition mode at a first acquisition start time, later than the first transmission start time by the tentative burst mode delay value; and determining, by the first receiver, whether the phase 1 ranging message was successfully received.

In one embodiment, each of the plurality of respective measures of success is whether all of the one or more test transmissions were successful, and wherein the calculating of an operating burst mode transmitter to receiver delay includes calculating the operating burst mode transmitter to receiver delay value as the average of: a maximum tentative burst mode transmitter to receiver delay value for which all of the one or more test transmissions were successful, and a minimum tentative burst mode transmitter to receiver delay value for which all of the one or more test transmissions were successful.

In one embodiment, the method includes calculating an operating burst mode transmitter to receiver delay value as the average of: a maximum tentative burst mode transmitter to receiver delay value for which the transmission success rate exceeds a first threshold, and a minimum tentative burst mode transmitter to receiver delay value for which the transmission success rate exceeds a second threshold.

In one embodiment, the method includes, before the transmitting, by the first transmitter, of the phase 1 ranging message: synchronizing the clock associated with the first transmitter, the clock associated with the first receiver, and a clock associated with the arbiter.

In one embodiment, the synchronizing of the clock associated with the first transmitter, the clock associated with the first receiver, and the clock associated with the arbiter includes utilizing a Precision Time Protocol.

In one embodiment, the clock associated with the first transmitter and/or the clock associated with the first receiver is phase-locked to a reference clock signal transmitted to the first transmitter and/or the clock associated with the first receiver by the arbiter.

In one embodiment, the clock associated with the first transmitter and/or the clock associated with the first receiver operates at a frequency which is a multiple of a frequency of the reference clock signal.

In one embodiment, the clock associated with the first transmitter and/or the clock associated with the first receiver operates at the same frequency as a frequency at which the clock associated with the arbiter operates.

In one embodiment, the clock associated with the first transmitter is the same clock as the clock associated with the first receiver.

In one embodiment, the method includes, before the performing of the one or more test transmissions: establishing a connection, through the circuit switch, from the first transmitter to the first receiver; sending, by the first transmitter, one or more phase 0 ranging messages, each phase 0 ranging message including a timestamp, the timestamp indicating a time at which the phase 0 ranging message was transmitted; receiving, by the first receiver, a phase 0 ranging message of the one or more phase 0 ranging messages; determining, by the first receiver, a time at which the phase 0 ranging message was received; and calculating a continuous mode transmitter to receiver delay as the difference between: the time at which the phase 0 ranging message was received, and the time at which the phase 0 ranging message was transmitted.

In one embodiment, the time at which the phase 0 ranging message was transmitted is the time at which the first bit of the phase 0 ranging message was transmitted, and the time at which the phase 0 ranging message was received is the time at which the first bit of the phase 0 ranging message was received.

In one embodiment, the method includes: establishing a connection through the circuit switch from the first transmitter to the first receiver; transmitting, beginning at a first point in time, by the first transmitter, a plurality of phase 2 ranging messages, each having an identifier; breaking, at a second point in time, following the first point in time, the connection from the first transmitter to the first receiver; determining, by the first receiver, the identifier of the last successfully received message; and determining, from the second point in time and from a point in time at which the last successfully received message was transmitted, a coarse transmitter to switch delay value.

In one embodiment, the determining of the coarse transmitter to switch delay value includes calculating the difference between: the point in time at which the last successfully received message was transmitted; and the second point in time.

In one embodiment, the method includes performing, for each of a plurality of tentative transmitter to switch delay values, one or more test transmissions, to generate a plurality of respective measures of success, each corresponding to one of the plurality of tentative transmitter to switch delay values, wherein the performing of each test transmission, for a tentative transmitter to switch delay value of the plurality of tentative transmitter to switch delay values, includes: sending a phase 3 ranging message at a respective sending time; establishing a connection, through the circuit switch, from the first transmitter to the first receiver, at a respective connecting time following the respective sending time by the tentative transmitter to switch delay value; breaking the connection; and determining whether the phase 3 ranging message was successfully received.

In one embodiment, each of the phase 3 ranging messages includes one or more forward error correction encoded data blocks.

In one embodiment, the method includes determining whether only a portion of a phase 3 ranging message was successfully received, and, when only a portion of a phase 3 ranging message was successfully received, determining a number of successfully received forward error correction encoded data blocks of the one or more forward error correction encoded data blocks.

In one embodiment, the method includes calculating an amount by which a tentative transmitter to switch delay value is too small as the product of: the length of each of the one or more forward error correction encoded data blocks, and the difference between: the number of forward error correction encoded data blocks in each phase 3 ranging message, and the number of successfully received forward error correction encoded data blocks.

In one embodiment, the tentative transmitter to switch delay values are separated by increments of one clock cycle of a clock of the arbiter.

In one embodiment, the method includes calculating an operating transmitter to switch delay value as the average of: a maximum tentative transmitter to switch delay value for which the transmission success rate exceeds a third threshold, and a minimum tentative transmitter to switch delay value for which the transmission success rate exceeds a fourth threshold.

In one embodiment, the method includes performing, for each of a plurality of tentative transmitter to switch delay values, one or more test transmissions, to generate a plurality of respective measures of success, each corresponding to one of the plurality of tentative transmitter to switch delay values, wherein the performing of each test transmission, for a tentative transmitter to switch delay value of the plurality of tentative transmitter to switch delay values, includes: sending a phase 3 ranging message, the last bit of the message being sent at a respective sending time; establishing a connection, through the circuit switch, from the first transmitter to the first receiver; breaking the connection at a respective disconnecting time following the respective sending time by the tentative transmitter to switch delay value; and determining whether the phase 3 ranging message was successfully received.

In one embodiment, the method includes detecting and/or measuring a drift in a delay by: transmitting, by the first transmitter and/or the second transmitter, a plurality of frames, each including a preamble, a start frame delimiter, and one or more forward error correction blocks including live data; receiving the frames, by the first receiver and/or the second receiver; detecting a drift in a delay by: detecting an increasing error rate in: the received start frame delimiters; and/or in the received forward error correction blocks; and/or detecting a change in the difference between a start frame delimiter receipt time and a received acquisition start time, the start frame delimiter receipt time being the time at which the first bit of a start frame delimiter is received.

In one embodiment, the method includes: determining, by the second receiver whether a start frame delimiter error occurred during the reception of the second frame by the second receiver; determining, by the second receiver whether a forward error correction error occurred during the reception of the second frame by the second receiver; and when a start frame delimiter error occurred during the reception of the first frame by the first receiver and a start frame delimiter error occurred during the reception of the second frame by the second receiver, reducing an operating transmitter to switch delay for the first transmitter by a time increment.

In one embodiment, the time increment is one cycle of a clock associated with the arbiter.

In one embodiment, the method includes, when a forward error correction error occurred during the reception of the first frame by the first receiver and a forward error correction error occurred during the reception of the second frame by the second receiver, increasing an operating transmitter to switch delay for the first transmitter by a time increment.

In one embodiment, the method includes: when the number of preamble bits is less than a set number: reducing an operating burst mode switch to receiver delay for the first receiver by a time increment; and when the number of preamble bits is greater than the set number: increasing the operating burst mode switch to receiver delay for the first receiver by a time increment.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for synchronization and ranging in a switching system provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
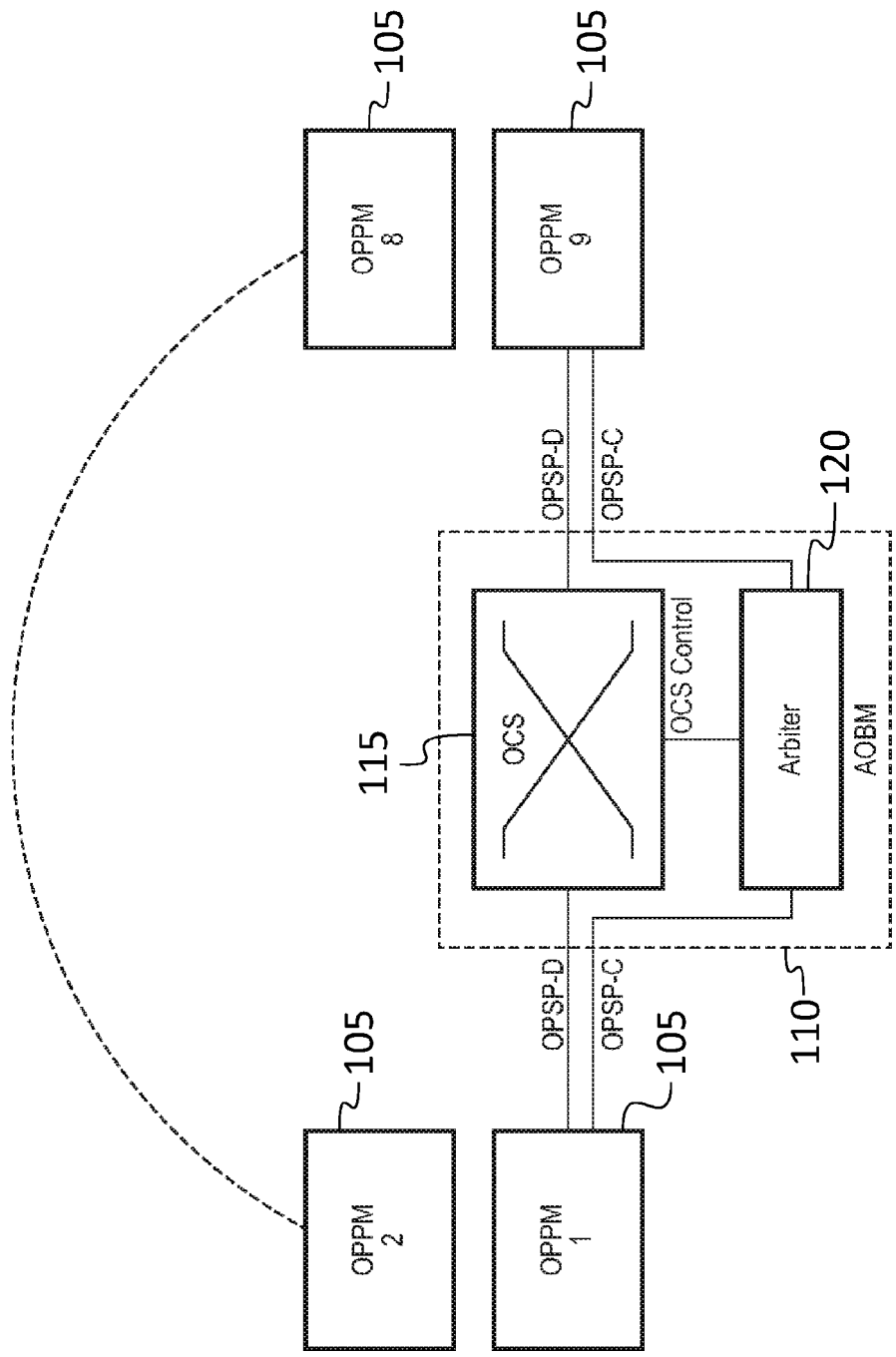
FIG. 1 is a block diagram of a portion of a switching system, according to an embodiment of the present invention.

Referring to FIG. 1, in some embodiments a switching system includes a plurality of optical packet processing modules (OPPMs) 105 and an active optical backplane module (AOBM) 110. The active optical backplane module includes an optical circuit switch 115 (OCS), or simply "circuit switch" 115 and an arbiter 120. In operation, data are transmitted, in a data plane (which may use optical connections), between the optical packet processing modules 105, through the circuit switch 115, under the control of the arbiter 120. The interactions between the arbiter 120 and (i) the optical packet processing modules 105 and (ii) the circuit switch 115 may take place in a control plane (which may use electrical connections). Each optical packet processing module 105 may have one or more bidirectional connections to the circuit switch 115. Each such connection may include two optical fibers, one connected to an optical transmitter in the optical packet processing module 105 and one connected to an optical receiver in the optical packet processing module 105. Data transmitted by an optical packet processing module 105 may be "live" data received from a client (not shown in FIG. 1), external to the switching system, or it may be data generated by the optical packet processing module 105, e.g., data designed to facilitate ranging operations as described in further detail below.

Figure 2:
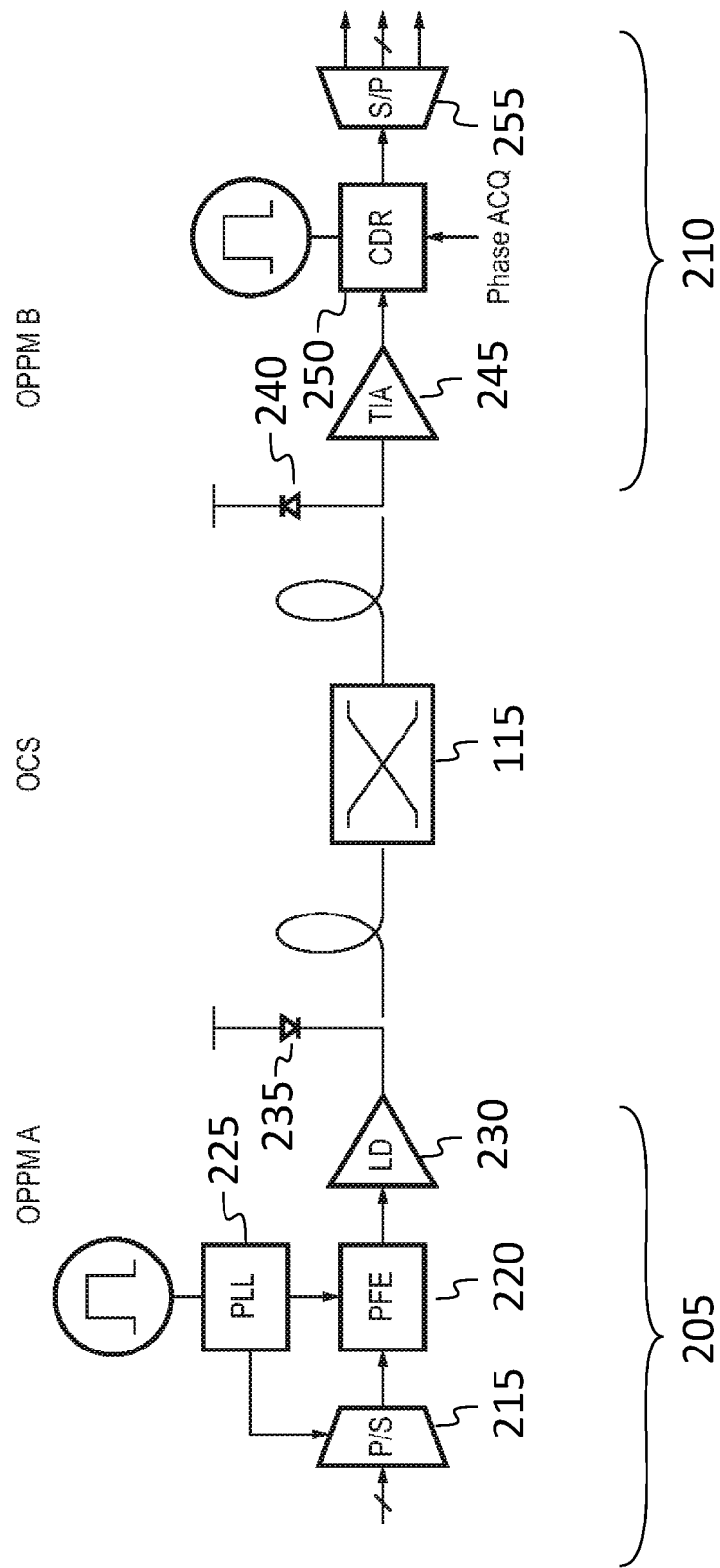
FIG. 2 is a block diagram of a portion of a switching system, according to an embodiment of the present invention.

FIG. 2 shows a link between a transmitter circuit 205 in one optical packet processing module (OPPMA) and a receiver circuit 210 in another optical packet processing module (OPPMB), through a circuit switch 115. The transmitter includes a parallel to serial converter 215, a pre-emphasis or pulse shaper circuit (PFE) 220, a phase locked loop 225 that provides a data clock signal to the parallel to serial converter 215 and to the PFE 220, a laser or modulator driver 230, and a modulated laser or modulator 235. The receiver circuit 210 may include a photodetector 240 (e.g., a photodiode), a transimpedance amplifier 245, a clock and data recovery circuit (CDR) 250, and a serial to parallel converter 255.

Referring again to FIG. 1, data transfers through the circuit switch 115 may take place in time slots of fixed width. For example, if a first optical packet processing module, e.g., OPPM1 has data to send to another optical packet processing module, e.g., OPPM9, then OPPM1 may inform the arbiter 120 that it has such data to send. The arbiter 120 may then schedule a future time slot during which the data (or a portion of it) will be sent, and (i) instruct OPPM1 to send the data during the allocated time slot, (ii) instruct the circuit switch 115 to establish a connection between OPPM1 and OPPM9 during the allocated time slot, and (iii) instruct OPPM9 to re-acquire clock and phase synchronization during the allocated time slot.

Each optical packet processing module 105 may transmit data at a relatively high data rate, e.g., at a raw data rate equal to a data clock rate of 32 GHz (for a raw data rate of 32 Gb/s), which may correspond to a net data rate of 25 Gb/s, after overhead (e.g., for forward error correction (FEC) and for switching time) is taken into account. The data may have an embedded clock, in the sense that each receiver may infer the data clock from the data, using a clock and data recovery circuit (CDR), and in the sense that the data may lack long intervals without transitions that, if present, would compromise the operation of the CDR. The control plane may operate with a control clock frequency, e.g. 1.25 GHz, which may be generated within each optical packet processing module 105 based on a reference clock signal at a lower frequency, e.g., 312.5 MHz, as discussed in further detail below.

The optical packet processing modules 105 may be synchronized, as described in further detail below, to a precision comparable to or better than the control clock frequency, e.g., to a precision of order 1 ns. The synchronization may be too coarse, however, for the respective data clocks of the optical packet processing modules 105 to be in the same phase, and the propagation delays between optical packet processing modules 105 may not be sufficiently well known for any optical packet processing module 105 to be able to anticipate, with respect to its own data clock, the phase of the modulation of a data signal received through the circuit switch 115. For this reason, when, for example, OPPM9 receives data from OPPM1 during a first time slot and then receives data from OPPM2 during a second time slot, there may be an interval, at the beginning of the second time slot, referred to as the CDR acquisition time during which the CDR of OPPM9 may lock to or "acquire" the embedded clock frequency and phase. The switching action of the circuit switch 115 may not be instantaneous, and, accordingly, there may be an interval between the breaking of optical connections at the end of one time slot and the making of new optical connections in the subsequent time slot. For these reasons, each time slot may include a setup interval (e.g., 10 ns) for setting up new connections (i.e. for making the optical connections in the circuit switch 115, and for CDR acquisition), and a transmission interval (e.g., 90 ns) for transmitting data (with the time slot length being, e.g., 100 ns).

Each CDR may be operable in three modes, including a high-bandwidth "fast acquisition" mode capable of rapidly locking to an embedded clock signal, and a lower bandwidth "continuous" mode exhibiting lower phase noise than the fast acquisition mode. In operation, each CDR may switch to fast acquisition mode at the beginning of each time slot, and then transition to continuous mode after the CDR has locked to the embedded clock. The CDR may also be able to operate in a "wait" mode, e.g., before transitioning to fast acquisition mode; in the wait mode the filter elements of the CDR may be held in respective states corresponding to zero phase error in the CDR loop, to prevent the phase error estimate from creeping to a large non-zero value when no signal is received.

A sequence of bits transmitted during one time slot (i.e., during the transmission interval of the time slot) may be referred to as a "frame". Each frame may include a preamble, a start frame delimiter, a payload, and an error check sequence. The preamble may be a sequence of bits (e.g., alternating ones and zeros) enabling the CDR to lock quickly. The start frame delimiter may be a unique sequence of bits allowing the receiver to identify, in the received stream of bits, the end of the preamble, and to infer the start of the payload and of the error check sequence, each of which may also be of fixed length. In some embodiments, the start frame delimiter is bit error tolerant, i.e., it is chosen (and the receiver is configured) so that even if a certain number of bits of the start frame delimiter are flipped (e.g., as a result of noise) during transmission, or even if a certain number of bits are truncated from the beginning of the start frame delimiter, the receiver may nonetheless recognize it and identify where it ends (and the payload begins). The error check sequence may be, for example, a cyclic redundancy check code, or it may be absent if error checking is not performed, or if redundant data used for forward error correction are included in the payload. A block of data that has been encoded, as a block, with forward error correction coding (and that may be decoded to recover the encoded data), may be referred to as an "FEC block".

Propagation delays within each optical packet processing module 105 and within the active optical backplane module 110 may be known and relatively constant, but propagation delays between these elements may be poorly known at system startup and may vary significantly during operation. Accordingly, the switching system may perform a synchronization and ranging procedure, described in further detail below, at system startup, so that each optical packet processing module 105 may (using knowledge of propagation delays obtained in the procedure) send each frame at a time preceding the time at which a time slot begins, at the circuit switch 115, so that the beginning of the frame reaches the circuit switch 115 at the beginning of the time slot, and each optical packet processing module 105 may further transition its CDR to fast acquisition mode at a time (referred to as the "acquisition start time") that is later than the beginning of the time slot, so that the acquisition start time roughly coincides with the arrival of the beginning of the received frame at the optical packet processing module 105. The command setting an acquisition start time may be referred to as an "Rx Grant" command.

Figure 3:
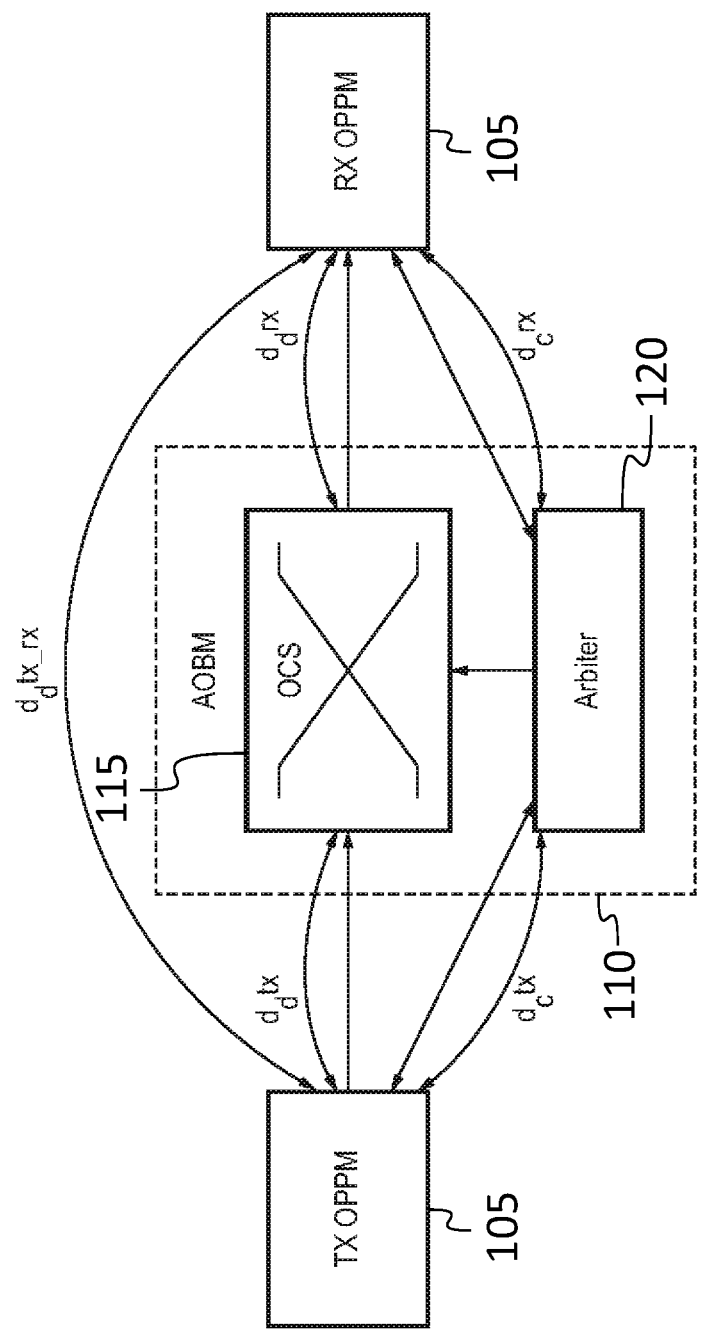
FIG. 3 is a block diagram of a portion of a switching system, according to an embodiment of the present invention.

In some embodiments it is sufficient to measure and/or calculate the delays, shown in FIG. 3, between a transmitting optical packet processing module 105 (TX OPPM), a receiving optical packet processing module 105 (RX OPPM), an arbiter 120, and a circuit switch 115. The control plane delays $d_c tx$ and $d_c rx$ may be measured, as described in further detail below, and used to synchronize clocks in the arbiter 120 and the optical packet processing modules 105, and the synchronized clocks may then be used, as described in further detail below, to measure the data plane delays $d_d tx$ (the transmitter to switch delay), $d_d tx\_rx$ (the continuous mode transmitter to receiver delay), and $d_d rx$ (the continuous mode switch to receiver delay).

The control plane delays may be measured using (or using a method analogous to) the Precision Time Protocol (PTP) specified in standards defined by the Institute of Electrical and Electronics Engineers (IEEE) (e.g., in the IEEE 1588-2002 standard, or in the IEEE 1588-2008 standard). By exchanging messages referred to in these standards as Sync, Delay_Req, Follow_Up and Delay_Resp, two devices (such as the arbiter 120 and an optical packet processing module 105) are able to determine the transit time between them, and to synchronize their respective clocks. Once this process has been completed, the control clocks of each of the optical packet processing modules 105 and of the arbiter 120 may be synchronized to a single clock, e.g., the clock of the arbiter 120.

In some embodiments, the continuous mode transmitter to receiver delay $d_d tx\_rx$ is then measured using a process referred to herein as phase 0 ranging, and the burst mode transmitter to receiver delay $d_d tx\_rx_b$ is measured using a process referred to herein as phase 1 ranging. In the phase 0 ranging process, the arbiter 120 configures the circuit switch 115 to establish a continuous connection (i.e., a connection of indefinite duration, and that may last longer than one time slot) between the transmitter and the receiver. It then instructs the transmitter to begin sending a sequence of messages, referred to as "phase 0 ranging messages", and instructs the receiver to listen for phase 0 ranging messages. The phase 0 ranging messages may be contiguous, i.e., there may be no gaps between them, so that once the CDR of the receiver has locked onto the embedded clock, it remains locked until it stops receiving phase 0 ranging messages. The CDR of the receiver may transition out of the wait mode some time (e.g., 300 ns) after the transmitter begins transmitting phase 0 ranging messages, to reduce the risk of the phase error estimate of the CDR creeping to a large non-zero value while no signal is received. The CDR may transition from the wait mode first into fast acquisition mode and then into continuous mode, or it may transition from the wait mode directly into continuous mode (which may result in a longer, but nonetheless acceptable, acquisition time). The phase 0 ranging messages may be longer or shorter than the normal length of a time slot.

Each phase 0 ranging message may include a start frame delimiter and a timestamp, the timestamp indicating the time at which the phase 0 ranging message was sent (e.g., the time at which the first bit of the start frame delimiter of the phase 0 ranging message was sent, or the time at which the first bit of the timestamp of the phase 0 ranging message was sent). The receiver then calculates the data plane delay as the difference between (i) the time of receipt of a bit (e.g., the first bit of the start frame delimiter or the first bit of the timestamp) to which a timestamp corresponds and (ii) the timestamp received (i.e., the time at which the phase 0 ranging message was sent). This calculation completes the phase 0 ranging process.

In a subsequent phase, referred to herein as phase 1 ranging, the burst mode transmitter to receiver delay is measured. The burst mode transmitter to receiver delay is the delay between (i) the time (referred to as the "transmission start time") at which the transmitter starts transmitting, and (ii) the acquisition start time, for which the receiver reliably receives a frame. The command setting a transmission start time may be referred to as a "Tx Grant" command. The burst mode transmitter to receiver delay may differ from the continuous mode transmitter to receiver delay, as a result, for example, of the behavior of the CDR during lock. In some embodiments, to perform phase 1 ranging, the arbiter 120 configures the circuit switch 115 to establish a continuous connection (as in phase 0 ranging), and the transmitter sends out a sequence of phase 1 ranging messages. The phase 1 ranging messages are separated by gaps (i.e., by time intervals during which no signal is sent, e.g., no light is transmitted). Each of the phase 1 ranging messages includes a CRC code or an FEC block or by some other mechanism enables the receiver to determine whether the phase 1 ranging messages was successfully received. The arbiter 120 also sends, to the receiver, for each of the phase 1 ranging messages, an Rx Grant command specifying an acquisition start time.

If, for any phase 1 ranging message, the acquisition start time is too early or too late (i.e., the receiver CDR transitions to fast acquisition mode too early or too late), the phase 1 ranging message may not be properly received. For example, if the acquisition start time is too early, the CDR loop may creep into a state of large estimated phase error before the beginning of the preamble is received, and the loop may not recover from the large error in time to receive the first bits of the start frame delimiter. If the acquisition start time is too late, the CDR loop may not lock in time to receive the first bits of the start frame delimiter. In either case, if the start frame delimiter is not properly received, the reception of the message may fail.

The system may therefore find, by a trial and error process, a range of acceptable burst mode delay values, i.e., values of the burst mode transmitter to receiver delay which, when used as the basis for calculating a commanded acquisition start time (e.g., an acquisition start time included in an Rx Grant command), result in successful reception of a phase 1 ranging message. The trial and error process may involve, for each of a plurality of tentative burst mode transmitter to receiver delay values, performing one or more test transmissions, and determining, for each of the tentative values, a measure of success. The measure of success may be a transmission success rate, or, if only one test transmission is performed for each tentative burst mode transmitter to receiver delay value, it may be a binary result, i.e., transmission success or transmission failure. The transmission success rate (i.e., the fraction of transmitted phase 1 ranging messages that are successfully received) for each tentative burst mode delay value may be determined by sending a plurality of phase 1 ranging message at each tentative burst mode delay and counting the number of phase 1 ranging messages successfully received. Finally, a burst mode transmitter to receiver delay to be used in operation, referred to herein as an "operating burst mode transmitter to receiver delay" may be selected, based on the measures of success (e.g., the measurements of transmission success rate) as a function of tentative burst mode transmitter to receiver delay. For example, a maximum acceptable burst mode delay may be defined as the burst mode delay at which the transmission success rate drops, as the tentative burst mode delay is increased, to a first threshold (e.g., 80%), and a minimum acceptable burst mode delay may be defined as the burst mode delay at which the transmission success rate drops, as the tentative burst mode delay is decreased, to a second threshold (e.g., 75%), and the operating burst mode transmitter to receiver delay may be calculated as the average of the maximum acceptable burst mode delay and the minimum acceptable burst mode delay. In some embodiments the first threshold equals the second threshold. In other embodiments, e.g., if the slope of the transmission success rate is different at the two ends of the range of acceptable burst mode delays, another algorithm may be used to select the operating burst mode transmitter to receiver delay, to provide greater system margin. For example, a weighted average of the maximum acceptable burst mode delay and the minimum acceptable burst mode delay, with weights selecting according to the respective slopes, may be used. The selection of an operating burst mode transmitter to receiver delay completes the phase 1 ranging process. As used herein, a "trial and error" process for finding a value of a parameter that affects transmission success refers to any process involving testing transmission with a plurality of tentative values for the parameter, and determining for each tentative value whether or not (or what fraction of the time) transmission succeeds. The tentative values may be selected by any suitable method, e.g., they may be increasing over a set range, or decreasing, or they may be selected by a pseudorandom process.

Phase 2 ranging may be used to obtain a coarse measure of the data plane delay between the transmitter and the circuit switch 115. In some embodiments, the arbiter 120 commands the transmitter (i) to send out a preamble of sufficient length to ensure that the CDR of the receiver will be able to lock to the preamble, and (ii) to begin, at a commanded transmission start time (e.g., a transmission start time in a Tx Grant command), transmitting a sequence of messages referred to as phase 2 ranging messages, which may be sequentially numbered or contain another identifier allowing them to distinguished from each other. The phase 2 ranging messages may be contiguous (i.e., not separated by gaps); a mechanism may be provided (e.g., each phase 2 ranging message may include an error checking code or FEC block) to determine, for each phase 2 ranging message, whether it was successfully received by the receiver. The arbiter 120 also commands the circuit switch 115 to establish a connection when (or before) the transmitter begins to transmit the preamble, and to break the connection at a point in time that is later than the transmission start time by $t_{ranging}$.

The receiver identifies the sequence number of the last successfully received phase 2 ranging message, and a coarse measure of the transmitter to switch delay is calculated as $t_{ranging}-(N_{SR}*t_{R2})$ where $t_{R2}$ is the interval between the start times of consecutive phase 2 ranging messages, and $N_{SR}$ is the number of the last successfully received phase 2 ranging message. Equivalently, the delay may be calculated as the difference between the point in time $t_0+N_{SR}*t_{R2}$ at which the last successfully received message was transmitted (where $t_0$ is the point in time at which the first message was transmitted) and the point in time $t_0+t_{ranging}$ at which the connection was broken.

Phase 3 ranging may be used to obtain an "operating transmitter to switch delay" which may be a finer measure, than the one obtained in phase 2 ranging, of the data plane delay between the transmitter and the circuit switch 115. The operating transmitter to switch delay may then be used in operation, to calculate transmission start times based on time slot start times. In some embodiments, during phase 3 ranging, the transmitter sends a sequence of phase 3 ranging messages of equal length, separated by gaps, and the arbiter 120 configures the switch to repeatedly establish a connection between the transmitter and the receiver, each connection interval being the same length as the phase 3 ranging messages. If the commanded transmission start time (e.g., in a Tx Grant command) is too early or too late with respect to the interval during which the connection is established, then a portion (at the beginning or at the end, respectively) of the phase 3 ranging message is not transmitted, and the receiver determines that the phase 3 ranging message was not successfully transmitted. If the portion that is not transmitted is at the beginning, then portions (or all of) the preamble and the start frame delimiter may be cut off (i.e., not received), the reception of the frame may fail entirely, and the receiver may report that no frame was detected. In one embodiment, each phase 3 ranging message includes a plurality of sequentially numbered FEC blocks, and, if the transmission start time is too late, so that only some of the FEC blocks are transmitted through the circuit switch 115, the receiver is able to successfully decode some, but not all, of the FEC blocks, and to conclude that the transmission start time was too late, and approximately by how much the transmission start time was too late. For example, the system may calculate the amount by which the transmission start time was too late as the product of the length of an FEC block and the number of FEC blocks that were not successfully received (i.e., as the product of the length of an FEC block and the difference between (i) the number of FEC blocks that were sent and (ii) the number of FEC blocks that were successfully received). The system may then select the next tentative transmitter to switch delay to be earlier by a corresponding amount.

The system then performs a trial and error process over a plurality of tentative transmitter to switch delay values. These tentative values may for example be evenly spaced (e.g., in increments of one period of the control clock (e.g., 0.8 ns), or in increments of the length of the start frame delimiter) over a range spanning two FEC block lengths and centered on the value determined by counting the number of successfully received FEC blocks. A measure of success (e.g., a transmission success rate) is determined for each of the tentative transmitter to switch delay values, and from the measure of success, as a function of the tentative transmitter to switch delay value, a suitable operating transmitter to switch delay is selected. For example, a maximum acceptable transmitter to switch delay may be defined as the transmitter to switch delay at which the transmission success rate drops, as the tentative transmitter to switch delay is increased, to 80%, and a minimum acceptable transmitter to switch delay may be defined as the transmitter to switch delay at which the transmission success rate drops, as the tentative transmitter to switch delay is decreased, to 80%. The operating transmitter to switch delay may then be calculated as the average of the maximum acceptable transmitter to switch delay and the minimum acceptable transmitter to switch delay. Finally, the operating burst mode switch to receiver delay $d_d\text{rx}_b$ is calculated as $d_d\text{tx\_rx}_b - d_d\text{tx} - d_d\text{sw}$, where $d_d\text{sw}$ is the delay through the switch, i.e., as the transmitter to receiver burst mode delay less (i) the transmitter to switch delay and (ii) the delay through the switch. As mentioned above, delays internal to the active optical backplane module (such as $d_d\text{sw}$) may be known (e.g., measured as part of the manufacturing process) and relatively constant. In the embodiment illustrated in FIG. 5, the delay $d_d\text{sw}$ through the switch may be equal to t0−t0 (i.e., the same for all paths through the switch). In some embodiments the delay for some paths through the switch (e.g., the path from OPPM1 to OPPM9) may be different from the delay for other paths through the switch (e.g., the path from OPPM1 to OPPM8). In such a case, the arbiter may have information about the delay for each path through the switch, and it may send each receiving optical packet processing module an Rx Grant command with a suitably adjusted respective acquisition start time.

In other embodiments, instead of each connection interval being the same length as the phase 3 ranging messages, the connection interval may be longer, and the operating transmitter to switch delay may be measured as (i) the value of the delay, between the start of transmission and the time at which the connection is established, at which the link transitions between transmission success and failure or (ii) the value of the delay, between the end of transmission and the time at which the connection is broken, at which the link transitions between transmission success and failure.

Figure 4:
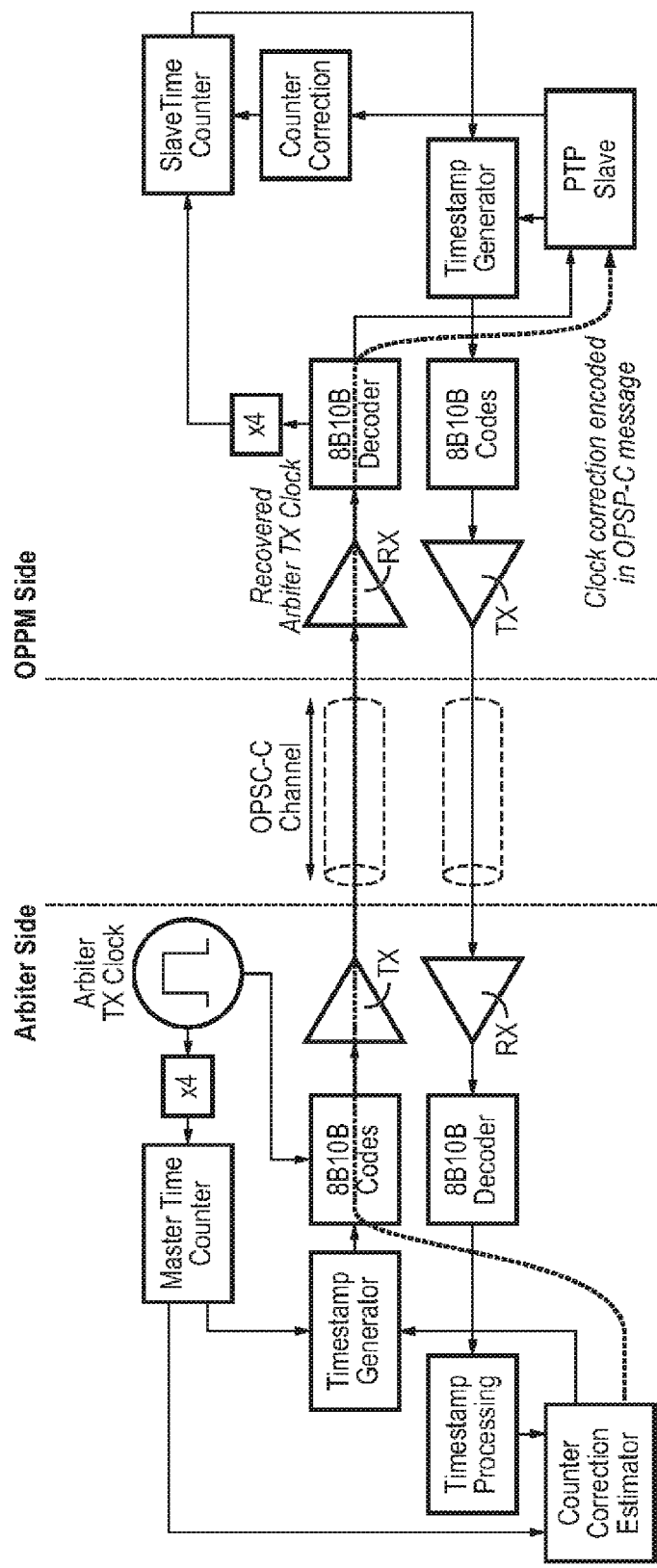
FIG. 4 is a block diagram of a system for communication in a control plane, according to an embodiment of the present invention.

Referring to FIG. 4, in the control plane, the arbiter may include a master time counter operating at the control clock frequency, which may be 4 times the reference clock signal frequency generated by the reference oscillator ("Arbiter TX clock" in FIG. 4). The reference oscillator controls the rate of serial transmission at an 8B10B code generator that ensures that the transmitted data have transitions at a sufficient rate for the control plane receiver RX (in the optical packet processing module) to lock to the embedded clock. The master time counter is used by the timestamp generator to transmit timestamps to the optical packet processing module. In the optical packet processing module the reference clock signal is regenerated from the embedded clock by the CDR (within the control plane receiver RX) and it is multiplied by 4 to create a clock signal at the control clock frequency, which drives the slave time counter. The timestamp processing, counter correction estimator, counter correction, and PTP slave circuits perform the synchronization of the slave time counter to the master time counter, using, e.g., PTP. The multiplication by 4 may be performed, for example, by a phase locked loop or by a delay locked loop.

Figure 5:
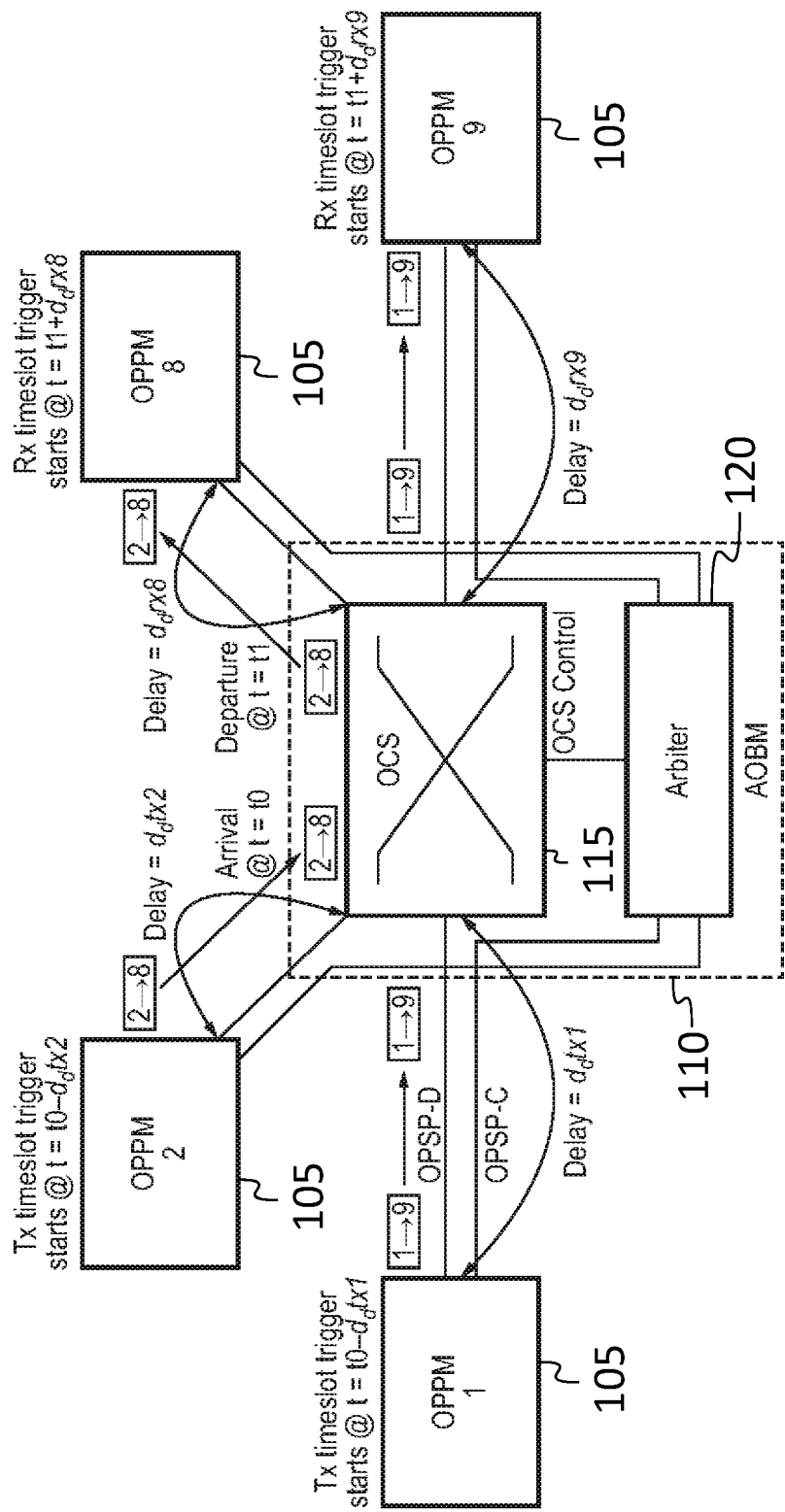
FIG. 5 is a block diagram of a portion of a switching system, according to an embodiment of the present invention.

Referring to FIG. 5, as mentioned above, in operation, the arbiter 120 may control each optical packet processing module 105 to begin transmitting each frame before the beginning of the respective time slot by a time equal to $d_d\text{tx}$, so that the beginning of each frame arrives at the circuit switch 115 at the beginning of the time slot. The arbiter 120 may control each optical packet processing module 105 to transition its CDR to fast acquisition mode after the beginning of a respective time slot by an amount equal to $d_d\text{rx}_b + d_d\text{sw}$ (where, in FIG. 5, t1=t0+$d_d\text{sw}$), so that the CDR will we prepared to lock to the respective incoming frame at the time that it arrives at the receiver of the optical packet processing module 105.

It will be understood that the arbiter's control of the transmission start time and the acquisition start time may be performed in any of a number of ways. For example, arbiter commands may be prospective, e.g., the arbiter 120 may send a Tx Grant command specifying a time at which transmission is to begin, and the arbiter 120 may send the Tx Grant command far enough in advance (i.e., more than $d_c\text{tx}$ in advance of the scheduled transmission time) that the control plane delay will not prevent the Tx Grant command from being received in time. Similarly the arbiter may send an Rx Grant command in advance of the receipt, at the receiver, of a message or frame. In other embodiments the arbiter may send commands in real time, e.g., the arbiter may send a Tx Grant command at a time preceding the scheduled start of transmission by just enough time so that if the transmitter reacts immediately upon receiving the command, the transmission of the message or frame will begin at the scheduled time.

In another example, the arbiter may not send commands but may instead make a schedule available, along with delay values for all of the transmitters and receivers in the system, and each optical packet processing module may be responsible for fetching the necessary data and scheduling its own transmission start times and acquisition start times.

In some embodiments the arbiter may command a number of transmissions or receptions in a single command. For example, in operation, the arbiter may send the receiver a single command notifying it of the operating burst mode switch to receiver delay $d_drx_b$ and informing it when the time slot boundaries are (e.g., at each point in time when the time counter value is a multiple of 125), and the receiver may then set an acquisition start time at each point in time that follows a time slot boundary by a delay equal to $d_drx_b$.

In some embodiments the ranging processes described herein may be performed using a transmitter of one optical packet processing module and a receiver of another optical packet processing module. In other embodiments, if the optical circuit switch is suitably configured, the ranging processes described herein may be performed using a transmitter of an optical packet processing module and the receiver of the same optical packet processing module (in which case, the control clock associated with the transmitter may be the same control clock as the control clock associated with the receiver). In such an embodiment, if an optical packet processing module is to be added to a switching system during operation, then the ranging operations may be performed by the switch, the arbiter, and the optical packet processing module being added, without interrupting the operation of the remaining optical packet processing modules. As an alternative, one of the operating optical packet processing modules may be temporarily taken out of service to assist with the ranging operations of the optical packet processing module being added.

In operation, the time delays of the system may drift. These drifts may be measured by any of various methods, so that the operating delay values may be corrected. For example, drifts may be detected during normal operations when a start frame delimiter error is detected or when an FEC error is detected. If the transmitter to switch delay drifts, so that it is no longer substantially equal to the operating transmitter to switch delay value, and as a result the transmitter sends data too late, then the tail end portion of the frames will be corrupted due to the circuit switch prematurely disconnecting the circuit, resulting in FEC errors detected by each receiver that receives data from the affected transmitter. Accordingly, when several receivers all detect FEC errors when receiving data from a particular transmitter, the system may infer that the operating transmitter to switch delay value is too small, and the system may increase it slightly (e.g., by one cycle of the data clock).

If the transmitter to switch delay drifts, so that the transmitter sends data too early, then the head end portion of the frames will be corrupted due to the circuit switch belatedly connecting the circuit, resulting in start frame delimiter errors detected by each receiver that receives data from the affected transmitter. Accordingly, when several receivers all detect start frame delimiter errors when receiving data from a particular transmitter, the system may infer that the operating transmitter to switch delay value is too great, and the system may decrease it slightly (e.g., by one cycle of the data clock).

If one receiver detects errors (e.g., start frame delimiter errors) during operation, and if it detects such errors for frames received from each of a plurality of transmitters, it may infer that its own delay (i.e., $d_drx_b$ has drifted). It may then perform a trial and error process of adjusting $d_drx_b$, e.g., in increments of one control clock cycle, to determine the direction (i.e., the sign of changes in $d_drx_b$) for which the error rate is decreased, and it may continue in that direction until the error rate is acceptable or until an approximate minimum in the error rate is found. More generally, each of the delays in the system may be adjusted, during operation, in small increments, and changes in the operating delays that may improve the performance may be identified as corresponding to tentative delay adjustments that are correlated with reduced error rates.

As another example, a receiver may count the number of preamble bits it receives after achieving lock, and, if the number drifts away from a nominal operating value (e.g., a value determined by counting preamble bits immediately after phase 3 ranging is complete), the arbiter may infer (if several receivers report the same symptom when receiving data from a transmitter) that the transmitter's transmitter to switch delay has drifter, or (if the receiver reports the same symptom when receiving data from several transmitters) that the burst mode switch to receiver delay has drifted. In either case, the arbiter may command the affected optical packet processing module to make an appropriate correction.

It will be understood that although exemplary embodiments described herein have optical data plane connections and electrical control plane connection, the invention is not limited to such configurations, and the data plane connections may be electrical, for example and control plane connection may be optical or wireless. It will be understood that although in some examples described herein certain calculations are performed in an optical packet processing module or in the arbiter, these calculations may be performed by any suitable processing circuit that is part of, or suitably connected to the system. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Although exemplary embodiments of a system and method for synchronization and ranging in a switching system have been specifically described and illustrated herein, many modifications and variations will be apparent to those skilled in the art. Accordingly, it is to be understood that a system and method for synchronization and ranging in a switching system constructed according to principles of this invention may be embodied other than as specifically described herein. The invention is also defined in the following claims, and equivalents thereof.

What is claimed is:

1. A method for measuring delays in a system comprising a first transmitter connected to a first receiver through a circuit switch and an arbiter connected to the first transmitter, the circuit switch, and the first receiver, the method comprising:
  while a connection between the first transmitter and the
    first receiver is established, performing, for each of a plurality of tentative burst mode transmitter to receiver delay values, one or more test transmissions, to generate a plurality of respective measures of success, each corresponding to one of the plurality of tentative burst mode transmitter to receiver delay values; and calculating, from the respective measures of success, an operating burst mode transmitter to receiver delay;

wherein the performing of each test transmission comprises, for a tentative burst mode delay value of the plurality of tentative burst mode transmitter to receiver delay values:

transmitting, by the first transmitter, a phase 1 ranging message, at a first transmission start time;

commanding by the first receiver, a clock and data recovery circuit of the first receiver to transition from a wait mode to a fast acquisition mode at a first acquisition start time, later than the first transmission start time by the tentative burst mode delay value; and determining, by the first receiver, whether the phase 1 ranging message was successfully received.

2. The method of claim 1, wherein each of the plurality of respective measures of success is whether all of the one or more test transmissions were successful, and wherein the calculating of an operating burst mode transmitter to receiver delay comprises calculating the operating burst mode transmitter to receiver delay value as the average of:

a maximum tentative burst mode transmitter to receiver delay value for which all of the one or more test transmissions were successful, and a minimum tentative burst mode transmitter to receiver delay value for which all of the one or more test transmissions were successful.

3. The method of claim 1, wherein each of the plurality of respective measures of success is a transmission success rate, the method further comprising calculating an operating burst mode transmitter to receiver delay value as the average of:

a maximum tentative burst mode transmitter to receiver delay value for which the transmission success rate exceeds a first threshold, and a minimum tentative burst mode transmitter to receiver delay value for which the transmission success rate exceeds a second threshold.

4. The method of claim 1, wherein:

the time at which a phase 1 ranging message of a test transmission, of the one or more test transmissions, was transmitted is determined by a clock associated with the first transmitter, and the time at which the phase 1 ranging message was received is determined by a clock associated with the first receiver, the method further comprising, before the transmitting, by the first transmitter, of the phase 1 ranging message:

synchronizing the clock associated with the first transmitter, the clock associated with the first receiver, and a clock associated with the arbiter.

5. The method of claim 4, wherein the synchronizing of the clock associated with the first transmitter, the clock associated with the first receiver, and the clock associated with the arbiter comprises utilizing a Precision Time Protocol.

6. The method of claim 4, wherein the clock associated with the first transmitter and/or the clock associated with the first receiver is phase-locked to a reference clock signal transmitted to the first transmitter and/or the clock associated with the first receiver by the arbiter.

7. The method of claim 6, wherein the clock associated with the first transmitter and/or the clock associated with the first receiver operates at a frequency which is a multiple of a frequency of the reference clock signal.

8. The method of claim 7, wherein the clock associated with the first transmitter and/or the clock associated with the first receiver operates at the same frequency as a frequency at which the clock associated with the arbiter operates.

9. The method of claim 4, wherein the clock associated with the first transmitter is the same clock as the clock associated with the first receiver.

10. The method of claim 1, further comprising, before the performing of the one or more test transmissions:

establishing a connection, through the circuit switch, from the first transmitter to the first receiver;

sending, by the first transmitter, one or more phase 0 ranging messages, each phase 0 ranging message comprising a timestamp, the timestamp indicating a time at which the phase 0 ranging message was transmitted;

receiving, by the first receiver, a phase 0 ranging message of the one or more phase 0 ranging messages;

determining, by the first receiver, a time at which the phase 0 ranging message was received; and calculating a continuous mode transmitter to receiver delay as the difference between:

the time at which the phase 0 ranging message was received, and the time at which the phase 0 ranging message was transmitted.

11. The method of claim 10, where the time at which the phase 0 ranging message was transmitted is the time at which the first bit of the phase 0 ranging message was transmitted, and the time at which the phase 0 ranging message was received is the time at which the first bit of the phase 0 ranging message was received.

12. The method of claim 1, further comprising:

establishing a connection through the circuit switch from the first transmitter to the first receiver;

transmitting, beginning at a first point in time, by the first transmitter, a plurality of phase 2 ranging messages, each having an identifier;

breaking, at a second point in time, following the first point in time, the connection from the first transmitter to the first receiver;

determining, by the first receiver, the identifier of the last successfully received message; and determining, from the second point in time and from a point in time at which the last successfully received message was transmitted, a coarse transmitter to switch delay value.

13. The method of claim 12, wherein the determining of the coarse transmitter to switch delay value comprises calculating the difference between:

the point in time at which the last successfully received message was transmitted; and the second point in time.

14. The method of claim 1, further comprising performing, for each of a plurality of tentative transmitter to switch delay values, one or more test transmissions, to generate a plurality of respective measures of success, each corresponding to one of the plurality of tentative transmitter to switch delay values, wherein the performing of each test transmission, for a tentative transmitter to switch delay value of the plurality of tentative transmitter to switch delay values, comprises:

sending a phase 3 ranging message at a respective sending time;
establishing a connection, through the circuit switch, from the first transmitter to the first receiver, at a respective connecting time following the respective sending time by the tentative transmitter to switch delay value;
breaking the connection; and
determining whether the phase 3 ranging message was successfully received.

15. The method of claim 14, wherein each of the phase 3 ranging messages comprises one or more forward error correction encoded data blocks.

16. The method of claim 15, further comprising determining whether only a portion of a phase 3 ranging message was successfully received, and, when only a portion of a phase 3 ranging message was successfully received, determining a number of successfully received forward error correction encoded data blocks of the one or more forward error correction encoded data blocks.

17. The method of claim 16, further comprising calculating an amount by which a tentative transmitter to switch delay value is too small as the product of:
the length of each of the one or more forward error correction encoded data blocks, and
the difference between:
the number of forward error correction encoded data blocks in each phase 3 ranging message, and
the number of successfully received forward error correction encoded data blocks.

18. The method of claim 14, wherein the tentative transmitter to switch delay values are separated by increments of one clock cycle of a clock of the arbiter.

19. The method of claim 14, wherein the measure of success for each of the plurality of tentative transmitter to switch delay values is a transmission success rate,
the method further comprising calculating an operating transmitter to switch delay value as the average of:
a maximum tentative transmitter to switch delay value for which the transmission success rate exceeds a third threshold, and
a minimum tentative transmitter to switch delay value for which the transmission success rate exceeds a fourth threshold.

20. The method of claim 1, further comprising performing, for each of a plurality of tentative transmitter to switch delay values, one or more test transmissions, to generate a plurality of respective measures of success, each corresponding to one of the plurality of tentative transmitter to switch delay values, wherein the performing of each test transmission, for a tentative transmitter to switch delay value of the plurality of tentative transmitter to switch delay values, comprises:
sending a phase 3 ranging message, the last bit of the message being sent at a respective sending time;
establishing a connection, through the circuit switch, from the first transmitter to the first receiver;
breaking the connection at a respective disconnecting time following the respective sending time by the tentative transmitter to switch delay value; and
determining whether the phase 3 ranging message was successfully received.

21. The method of claim 1, wherein the system further comprises a second transmitter and a second receiver, the method further comprising detecting and/or measuring a drift in a delay by:
transmitting, by the first transmitter and/or the second transmitter, a plurality of frames, each including a preamble, a start frame delimiter, and one or more forward error correction blocks including live data;
receiving the frames, by the first receiver and/or the second receiver;
detecting a drift in a delay by:
detecting an increasing error rate in:
the received start frame delimiters; and/or
in the received forward error correction blocks; and/or
detecting a change in the difference between a start frame delimiter receipt time and a received acquisition start time, the start frame delimiter receipt time being the time at which the first bit of a start frame delimiter is received.

22. The method of claim 21, wherein the transmitting, by the first transmitter and/or the second transmitter, of the plurality of frames, comprises:
transmitting, by each of the transmitters, frames of the plurality of frames through the circuit switch;
receiving, by the first receiver, a first frame from the first transmitter;
determining, by the first receiver whether a start frame delimiter error occurred during the reception of the first frame by the first receiver;
determining, by the first receiver whether a forward error correction error occurred during the reception of the first frame by the first receiver;
receiving, by the second receiver, a second frame from the first transmitter,
the method further comprising:
determining, by the second receiver whether a start frame delimiter error occurred during the reception of the second frame by the second receiver;
determining, by the second receiver whether a forward error correction error occurred during the reception of the second frame by the second receiver; and
when a start frame delimiter error occurred during the reception of the first frame by the first receiver and a start frame delimiter error occurred during the reception of the second frame by the second receiver, reducing an operating transmitter to switch delay for the first transmitter by a time increment.

23. The method of claim 22, wherein the time increment is one cycle of a clock associated with the arbiter.

24. The method of claim 21, further comprising, when a forward error correction error occurred during the reception of the first frame by the first receiver and a forward error correction error occurred during the reception of the second frame by the second receiver, increasing an operating transmitter to switch delay for the first transmitter by a time increment.

25. The method of claim 21, wherein the detecting of a change in the difference between a start frame delimiter receipt time and a received acquisition start time each frame comprises:
counting, by the first receiver, a number of preamble bits received for a first frame of the plurality of frames;
the method further comprising:
when the number of preamble bits is less than a set number:
reducing an operating burst mode switch to receiver delay for the first receiver by a time increment; and
when the number of preamble bits is greater than the set number:

increasing the operating burst mode switch to receiver delay for the first receiver by a time increment.

* * * * *